(12) United States Patent
Bucci et al.

(10) Patent No.: US 9,289,917 B2
(45) Date of Patent: Mar. 22, 2016

(54) METHOD FOR 3-D PRINTING A PATTERN FOR THE SURFACE OF A TURBINE SHROUD

(71) Applicant: General Electric Company, Schenectady, NY (US)

(72) Inventors: David Vincent Bucci, Simpsonville, SC (US); Srikanth Chandrudu Kottilingam, Simpsonville, SC (US); Prabhjot Singh, Guilderland, NY (US)

(73) Assignee: General Electric Company, Schenectady, NY (US)

(*) Notice: Subject to any disclaimer, the term of this patent is extended or adjusted under 35 U.S.C. 154(b) by 100 days.

(21) Appl. No.: 14/043,031

(22) Filed: Oct. 1, 2013

(65) Prior Publication Data

US 2015/0093506 A1  Apr. 2, 2015

(51) Int. Cl.
| | |
|---|---|
| *B05D 5/00* | (2006.01) |
| *C04B 35/48* | (2006.01) |
| *C04B 35/515* | (2006.01) |
| *B28B 1/00* | (2006.01) |
| *B28B 17/02* | (2006.01) |
| *F01D 11/12* | (2006.01) |
| *B33Y 10/00* | (2015.01) |

(Continued)

(52) U.S. Cl.
CPC . *B28B 1/001* (2013.01); *B05D 5/00* (2013.01); *B28B 17/02* (2013.01); *B29C 67/0081* (2013.01); *F01D 11/125* (2013.01); *B29C 67/0051* (2013.01); *B33Y 10/00* (2014.12); *F01D 5/20* (2013.01); *F05D 2230/30* (2013.01); *F05D 2230/50* (2013.01); *F05D 2230/60* (2013.01); *F05D 2230/90* (2013.01); *F05D 2250/18* (2013.01); *F05D 2250/181* (2013.01)

(58) Field of Classification Search
None
See application file for complete search history.

(56) References Cited

U.S. PATENT DOCUMENTS

| | | |
|---|---|---|
| 3,867,061 A | 2/1975 | Moskowitz |
| 5,520,508 A | 5/1996 | Khalid |

(Continued)

FOREIGN PATENT DOCUMENTS

| | | |
|---|---|---|
| EP | 1772441 A1 | 4/2007 |
| WO | 0226419 A1 | 4/2002 |

(Continued)

OTHER PUBLICATIONS

European Search Report and Written Opinion issued in connection with corresponding EP Application No. 14185563.5-1703 dated Feb. 20, 2015.

*Primary Examiner* — William Phillip Fletcher, III
(74) *Attorney, Agent, or Firm* — James W. Pemrick; Ernest G. Cusick; Frank A. Landgraff (57) ABSTRACT

A method of making an article of manufacture is provided and includes the steps of spraying a first coating onto a substrate, and depositing a second coating on the first coating by 3-D printing a material disposed in a pattern. The pattern includes ridges disposed at a base surface of a turbine part. Each ridge defined by first and second sidewalls, each sidewall having a first and second end. The ends extend from the base surface, the sidewalls slope toward each other until meeting at second ends of respective first and second sidewalls defining a centerline and a top portion of the ridge. The sidewalls are inclined with substantially equal but opposite slopes with respect to the base surface. The ridges correspond to a back portion of a turbine bucket and are oriented at a first angle with respect to an axis of rotation of the bucket.

20 Claims, 7 Drawing Sheets

(51) Int. Cl.
 *B29C 67/00* (2006.01)
 *F01D 5/20* (2006.01)

(56) References Cited

U.S. PATENT DOCUMENTS

| | | |
|---|---|---|
| 6,397,922 B1 | 6/2002 | Sachs et al. |
| 6,457,939 B2 | 10/2002 | Ghasripoor et al. |
| 6,519,500 B1 | 2/2003 | White |
| 6,627,835 B1 | 9/2003 | Chung et al. |
| 6,629,559 B2 | 10/2003 | Sachs et al. |
| 6,730,413 B2 | 5/2004 | Schaeffer et al. |
| 6,887,528 B2 | 5/2005 | Lau et al. |
| 7,141,207 B2 | 11/2006 | Jandeska, Jr. et al. |
| 7,351,290 B2 | 4/2008 | Rutkowski et al. |
| 7,387,488 B2 | 6/2008 | Nichols et al. |
| 7,600,968 B2 | 10/2009 | Nelson et al. |
| 7,614,847 B2 | 11/2009 | Nelson et al. |
| 7,749,565 B2 | 7/2010 | Johnson et al. |
| 8,007,246 B2 | 8/2011 | Rowe et al. |
| 8,257,600 B2 | 9/2012 | Raji |
| 8,741,194 B1 | 6/2014 | Ederer et al. |
| 2003/0054196 A1 | 3/2003 | Lau et al. |
| 2005/0003172 A1 | 1/2005 | Wheeler et al. |
| 2005/0164027 A1 | 7/2005 | Lau et al. |
| 2005/0276976 A1 | 12/2005 | Pfeifer et al. |
| 2005/0280185 A1 | 12/2005 | Russell et al. |
| 2011/0129640 A1 | 6/2011 | Beall et al. |
| 2011/0164981 A1 | 7/2011 | Hardwicke |

FOREIGN PATENT DOCUMENTS

| | | |
|---|---|---|
| WO | 03037607 A1 | 5/2003 |
| WO | WO 2014/149141 A1 * | 9/2014 |

* cited by examiner

METHOD FOR 3-D PRINTING A PATTERN FOR THE SURFACE OF A TURBINE SHROUD

BACKGROUND OF THE INVENTION

The present invention relates to patterns placed at the surface of metal components of gas turbine engines, radial inflow compressors and radial turbines, including micro-turbines and turbo-chargers, that are exposed to high temperature environments and, in particular, to a new method for applying patterns to turbine shrouds used in gas turbine engines in order to improve the performance and efficiency of the turbine blades (also known as "buckets").

Gas turbine engines are used in a wide variety of different applications, most notably electrical power generation. Such engines typically include a turbocompressor that compresses air to a high pressure by means of a multi-stage axial flow compressor. The compressed air passes through a combustor, which accepts air and fuel from a fuel supply and provides continuous combustion, thus raising the temperature and pressure of the working gases to a high level. The combustor delivers the high temperature gases to the turbine, which in turn extracts work from the high-pressure gas working fluid as it expands from the high pressure developed by the compressor down to atmospheric pressure.

As the gases leave the combustor, the temperature can easily exceed the acceptable temperature limitations for the materials used in construction of the nozzles and buckets in the turbine. Although the hot gases cool as they expand, the temperature of the exhaust gases normally remains well above ambient. Thus, extensive cooling of the early stages of the turbine is essential to ensure that the components have adequate life. The high temperature in early stages of the turbine creates a variety of problems relating to the integrity, metallurgy and life expectancy of components coming in contact with the hot gas, such as the rotating buckets and turbine shroud. Although high combustion temperatures normally are desirable for a more efficient engine, the high gas temperatures may require that air be taken away from the compressor to cool the turbine parts, which tends to reduce overall engine efficiency.

In order to achieve maximum engine efficiency (and corresponding maximum electrical power generation), it is important that the buckets rotate within the turbine casing or "shroud" with minimal interference and with the highest possible efficiency relative to the amount of energy available from the expanding working fluid.

During operation, the turbine casing (shroud) remains fixed relative to the rotating buckets. Typically, the highest efficiencies can be achieved by maintaining a minimum threshold clearance between the shroud and the bucket tips to thereby prevent unwanted "leakage" of a hot gas over tip of the buckets. Increased clearances will lead to leakage problem and cause significant decreases in overall efficiency of the gas turbine engine. Only a minimum amount of "leakage" of the hot gases at the outer periphery of the buckets, i.e., the small annular space between the bucket tips and turbine shroud, can be tolerated without sacrificing engine efficiency. Further, there are losses caused by the flow of hot gas over a particular portion of an interior surface of the turbine shroud when the bucket is not near the particular portion.

The need to maintain adequate clearance without significant loss of efficiency is made more difficult by the fact that as the turbine rotates, centrifugal forces acting on the turbine components can cause the buckets to expand in an outward direction toward the shroud, particularly when influenced by the high operating temperatures. Additionally, the clearance between a bucket tip and the shroud may be non-uniform over the entire circumference of the shroud. Non-uniformity is caused by a number of factors including machining tolerances, stack up tolerances, and non-uniform expansion due to varying thermal mass and thermal response. Thus, it is important to establish the lowest effective running clearances between the shroud and bucket tips at the maximum anticipated operating temperatures.

A significant loss of gas turbine efficiency results from wear of the bucket tips if, for example, the shroud is distorted or the bucket tips rub against the ceramic or metallic flow surface of the shroud. If bucket tips rub against a particular location of the shroud such that the bucket tip is eroded, the erosion of the bucket tip increases clearances between bucket tip and shroud in other locations. Again, any such deterioration of the buckets at the interface with the shroud when the turbine rotates will eventually cause significant reductions in overall engine performance and efficiency.

In the past, abradable type coatings have been applied to the turbine shroud to help establish a minimum, i.e., optimum, running clearance between the shroud and bucket tips under steady-state temperature conditions. In particular, coatings have been applied to the surface of the shroud facing the buckets using a material that can be readily abraded by the tips of the buckets as they turn inside the shroud at high speed with little or no damage to the bucket tips. The abradable type coatings have been applied by either spraying through a mask or screen to produce the pattern, or by spraying a solid pad or layer and then mechanically milling the pattern into the abradable pad. Both of these known techniques suffer the disadvantages of requiring many steps and the stack-up of the layers and resulting ridge heights of the abradable pattern are difficult to achieve with tight tolerances.

Initially, a clearance exists between the bucket tips and the coating when the gas turbine is stopped and the components are at ambient temperature. Later, during normal operation the clearance decreases due to the centrifugal forces and temperature changes in rotating and stationary components inevitably resulting in at least some radial extension of the bucket tips, causing them to contact the coating on the shroud and wear away a part of the coating to establish the minimum running clearance. Without abradable coatings, the cold clearances between the bucket tips and shroud must be large enough to prevent contact between the rotating bucket tips and the shroud during later high temperature operation. With abradable coatings, on the other hand, the cold clearances can be reduced with the assurance that if contact occurs, the sacrificial part is the abradable coating instead of the bucket tip.

Any coating material that is removed (abraded) from the shroud, however, should not affect downstream engine components. Ideally, the abradable coating material remains bonded to the shroud for the entire operational life of the gas turbine and does not significantly degrade over time. In other words, the abradable material is securely bonded to the turbine shroud and remains bonded while portions of the coating are removed by the bucket blades during startup, shutdown or a hot-restart. Preferably, the coating should also remain secured to the shroud during a large number of operational cycles, that is, despite repeated thermal cycling of the gas turbine engine during startup and shutdown, or periodic off-loading of power.

BRIEF DESCRIPTION OF THE INVENTION

According to an aspect of the present invention, a method of making an article of manufacture is provided. The method includes the steps of spraying a first coating onto a substrate, and depositing a second coating on the first coating by 3-D printing a material disposed in a pattern. The pattern includes a first plurality of ridges disposed at a base surface of a turbine part. Each ridge of the first plurality of ridges is defined by a first sidewall and a second sidewall. The first and second sidewalls each have a first end and an opposite second end. The first end of the first and second sidewalls extend from the base surface, and the first and second sidewalls slope toward each other until meeting at the second ends of respective first and second sidewalls defining a centerline and a top portion of the ridge. The first and second sidewalls are inclined with substantially equal but opposite slopes with respect to the base surface. At least a first portion of the first plurality of ridges correspond to at least a back portion of a turbine bucket and is oriented at a first angle with respect to an axis of rotation of the turbine bucket. The first angle ranges from about 20 degrees to about 70 degrees. The pattern includes the first plurality of ridges disposed at the base surface such that each ridge of the first plurality of ridges is substantially parallel to each other. The first angle is equal to an exit angle of a trailing edge of the turbine bucket.

According to an aspect of the present invention, a method of making an article of manufacture is provided. The method includes the steps of spraying a first thermal barrier coating onto a part, where the first thermal barrier coating is formed of a dense vertically cracked coating. A depositing step deposits a second thermal barrier coating on the first thermal barrier coating by 3-D printing the second thermal barrier coating in a pattern. The pattern includes a plurality of ridges disposed at a base surface of the part. A porosity of the second thermal barrier coating is controlled by adjusting 3-D printing attributes, and these attributes include at least one of a particle size distribution, a saturation level, a binder/volume ratio, or a layer thickness.

The above, and other objects, features and advantages of the present invention will become apparent from the following description read in conjunction with the accompanying drawings, in which like reference numerals designate the same elements.

BRIEF DESCRIPTION OF THE DRAWINGS

Referring now to the drawings wherein like elements are numbered alike in the several FIGURES.

DETAILED DESCRIPTION OF THE INVENTION

Figure 1:
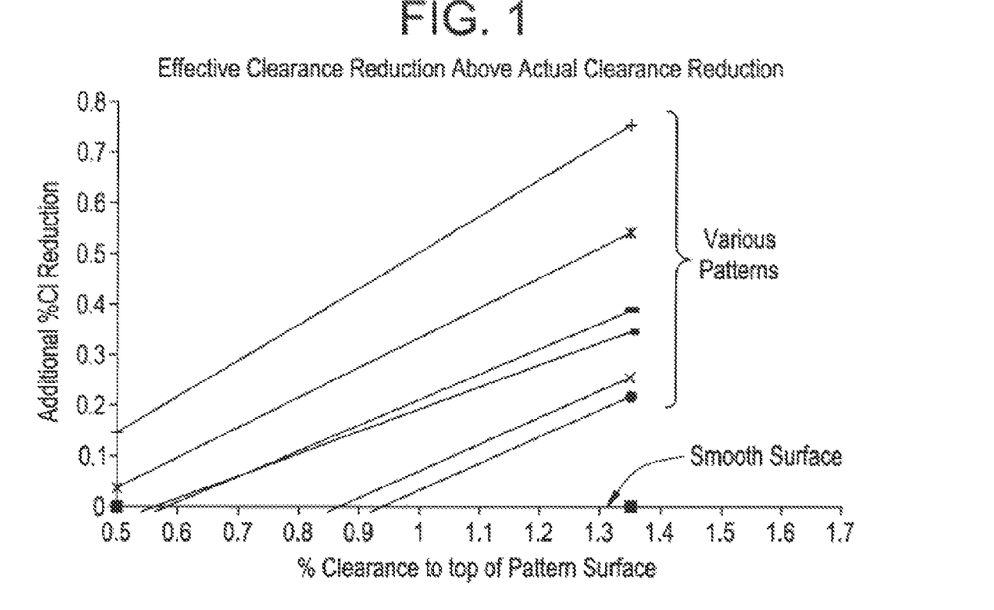
FIG. 1 is a graph showing the improvement in aerodynamic performance of a turbine due to the presence of a pattern over and above a decrease in a clearance between a turbine bucket tip and an interior surface of a turbine shroud.

Exemplary embodiments of the present invention include a method of applying an abradable coating defining a pattern that improves abradability of an abradable material and improves the aerodynamic performance of a turbine by improving a seal around a turbine bucket tip. Another exemplary embodiment includes a method of applying the pattern formed in an interior surface of a turbine shroud. Generally, the pattern is formed by 3-D printing a plurality of ridges of a material. The material may be, for example, unitary with the interior surface of the turbine shroud or an article of manufacture. Exemplary embodiments of the pattern improve aerodynamic performance of the turbine by decreasing a space between the turbine bucket tip and a turbine shroud, thereby improving the seal around the turbine bucket tip. An additional aerodynamic performance improvement is realized due to the pattern reducing aerodynamic losses between each turbine bucket tip of a plurality of turbine bucket tips. A patterned surface on the interior surface of the turbine shroud provides a direction to the mainstream flow on the outer wall. Thus, even if the seal were not improved, the patterned surface reduces aerodynamic losses. FIG. 1 is a graph illustrating the aerodynamic benefit of various alternative embodiments of the improved pattern. As shown in FIG. 1, there is a decrease in the effective clearance between the turbine bucket tip and the interior surface of the turbine shroud by disposing the pattern on the interior surface of the turbine shroud over and above any actual decrease in clearance caused by a presence of the pattern. An exemplary embodiment of the pattern also improves abradability by reducing the volume of abradable coating which must be removed during rubbing with the turbine bucket tip. Improved abradability of the pattern results in less erosion of the turbine bucket tip, thereby eliminating the need to treat each turbine bucket tip to reduce such erosion thereof.

Figure 2:
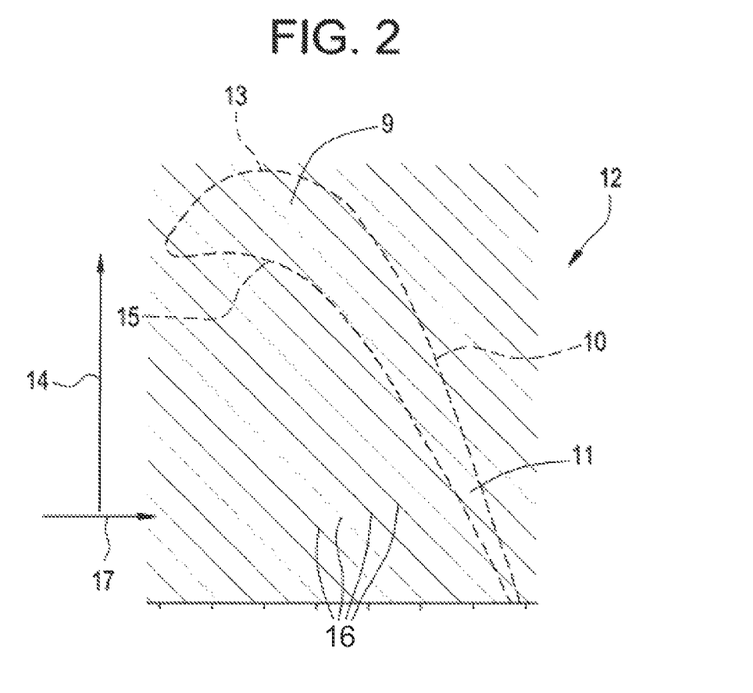
FIG. 2 is a plan view of an abradable pattern showing the outline of the outer surface of a turbine bucket tip with phantom lines in contact with the abradable pattern in accordance with an exemplary embodiment.

FIG. 2 is a view of an exemplary embodiment of an abradable pattern 12 showing a contact patch. The contact patch is an outline of the outer surface of a turbine bucket tip 10 with phantom lines in contact with the abradable pattern 12. Arrow 17 shows a direction of translation of the turbine bucket tip 10 with respect to the abradable pattern 12. In an exemplary embodiment, the translation of the turbine bucket tip 10 is caused by a rotation of the turbine bucket tip 10. Arrow 17 indicates a direction of a fluid flow with respect to the abradable pattern 12. Turbine bucket tip 10 comprises a front portion 9 and a back portion 11. Front portion 9 is a portion of the turbine bucket tip 10, which receives the fluid flow first in a blade row during turbine operation. Front portion 9 of the turbine bucket tip 10 is curved in a direction opposite the direction of translation 14 to improve aerodynamic characteristics of the turbine bucket tip 10. A leading surface 13 is a surface of the turbine bucket tip 10 which is in front of the turbine bucket tip 10 with respect to the direction of translation 14, when the turbine bucket tip 10 rotates during normal operation. A trailing surface 15 is a surface of the turbine bucket tip 10 which is in back of the leading surface 13 of the turbine bucket tip 10 with respect to the direction of translation 14, when the turbine bucket tip 10 rotates during normal operation. Back portion 11 is a portion of the turbine bucket tip 10, which follows the front portion 9 with respect to the direction of translation 14, when the turbine bucket tip 10 rotates during normal operation.

Abradable pattern 12 is defined by a first plurality of ridges 16 disposed on a base surface 20. Each ridge 16 of the plurality of ridges 16 is substantially parallel with each other ridge 16. Each ridge 16 of the plurality of ridges 16 is also substantially equidistant from each other ridge 16.

Figure 3:
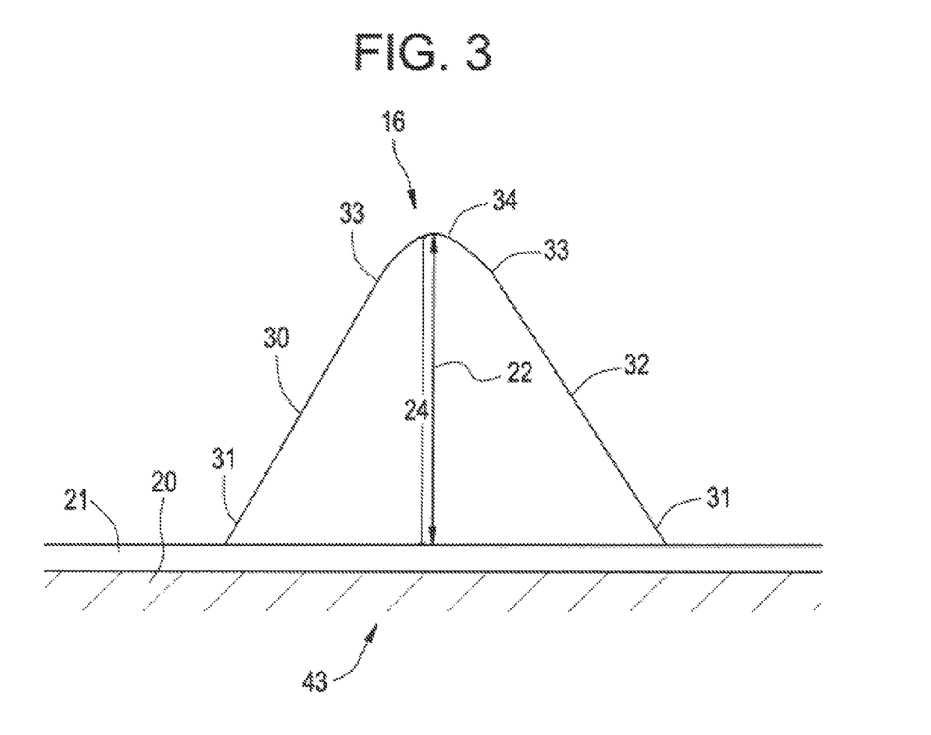
FIG. 3 is a cross section view of a ridge defining an exemplary embodiment of the abradable pattern.

FIG. 3 shows a cross section view of one ridge 16 from the first plurality of ridges 16 in an exemplary embodiment. Ridge 16 is disposed on the base surface 20. In an exemplary embodiment, base surface 20 is disposed at an interior surface of the turbine shroud 43, however, base surface 20 is not limited thereto and includes other suitable surfaces. Base surface 20 includes a thermal barrier coating applied to the interior surface of the turbine shroud 43, a metallic bond coating applied to the interior surface of the turbine shroud 43, or an exposed inner surface of the turbine shroud, for example. The exposed inner surface of the turbine shroud includes but is not limited to a metallic and a ceramic surface. The thermal barrier coating includes for example, barium strontium aluminosilicate or zirconia, either partially or fully stabilized with yttria (e.g., at about 7% to about 20%), ytterbia stabilized zirconia, pure zirconia (non-stabilized, i.e. about 99.9%), magnesia, calcia, or other stabilizers. The metallic bond coating includes an inter-metallic of Beta-NiAl; and a MCrAlX, the M comprising at least one of nickel, cobalt, iron and a combination of any of nickel, cobalt and iron and X comprising at least one of yttria, zirconium, silicon, hafnium and a combination of any of yttria, zirconium, silicon, hafnium. For example, the metallic bond coating could comprise MCrAlX, the M comprising at least one of nickel, cobalt, or iron (or combinations thereof) and X comprising at least one of yttria, zirconium, silicon, hafnium (or combinations thereof). The base surface 20 is optionally covered in a layer of abradable coating 21. If the layer of abradable coating 21 is used, the layer is up to about 0.32 mm in height from base surface 20. Ridge 16 has a centerline 22 and a ridge height 24. The ridge height 24 at the centerline 22 is measured from the base surface 20 to a top portion 34. If the layer of abradable coating 21 is used, ridge height 24 is measured from an outer surface of the layer of abradable coating 21 to the top portion 34. The ridge height 24 of each ridge 16 is equal to the ridge height 24 of each other ridge 16 in the first plurality of ridges 16. The ridge height 24 ranges from about 0.1 mm to about 4 mm, with a preferable ridge height 24 ranging from about 0.25 mm to about 2 mm. Each ridge 16 is defined by a first sidewall 30 and a second sidewall 32. First and second sidewalls 30 and 32 are defined by a first end 31 and a second end 33. First ends 31 of both first and second sidewalls 30 and 32 are disposed in contact with the base surface 20 and extended therefrom. Second ends 33 of both first and second sidewalls 30 and 32 join together and define the top portion 34. First and second sidewalls 30 and 32 are disposed such that first and second sidewalls 30 and 32 slope towards each other as they extend from base surface 20. Bisecting ridge 16 at top portion 34 corresponds with the centerline 22 of each ridge 16. First and second sidewalls 30 and 32 slope toward the centerline 22 with substantially equal, but opposite, slopes with respect to the base surface 20. The shape of the top portion 34 may be substantially curved, corresponding to connecting second ends of respective first and second sidewalls 30 and 32 as illustrated, or defines two sides of a triangle when seen in a cross section view.

The abradable coating 21 and/or ridges 16 may be comprised of a thermal barrier coating (TBC). The TBC may be adjacent to and overlies a bond coat layer. The thickness of the TBC is typically in the range of from about 1 to about 100 mils (from about 25 to about 2540 microns) and will depend upon a variety of factors, including the design parameters for the article that is involved. For example, for turbine shrouds, the TBC is typically thicker and is usually in the range of from about 30 to about 70 mils (from about 762 to about 1778 microns), more typically from about 40 to about 60 mils (from about 1016 to about 1524 microns). By contrast, in the case of turbine blades, the TBC is typically thinner and is usually in the range of from about 3 to about 30 mils (from about 76 to about 762 microns), more typically from about 3 to about 10 mils (from about 76 to about 254 microns).

The TBC may comprise a high fracture toughness inner layer that is adjacent to and overlies the bond coat layer. It has been found that spallation and removal of the TBC caused by impact damage typically does not occur in a gradual, erosion-like fashion. Instead, it has been found to typically be the result of vertically extending crack(s) forming and propagating from the outer surface of the TBC (due to the impact of hard objects), to the interface between the TBC and bond coat layer, thus causing failure of the TBC at or proximate to this interface, i.e., where final delamination of TBC occurs. It has been further found that horizontally extending cracks can also form at various depths or levels of TBC that are spaced from this interface. As a result, a series of "tiered" sections or layers can become detached and lost where these horizontal cracks form in the TBC. The high fracture toughness of the inner layer of the TBC positioned at the interface between the bond coat layer and an outer thermal insulating layer is believed to interrupt the propagation of these vertically extending cracks, as well as to minimize or prevent the formation and propagation of the horizontally extending cracks, thus imparting impact and spallation resistance to the TBC, and especially to the outer thermal insulating layer. The use of such a high fracture toughness inner layer can be especially desirable for certain outer thermal insulating layers having reduced thermal conductivity that tend to be more susceptible to such vertical crack propagation caused by impact damage.

The inner layer is typically formed as a relatively thin layer to impart impact and spallation resistance to the TBC, especially to the outer layer, and so as not to unduly affect the other desirable (e.g., mechanical and thermal insulating) properties of the TBC, including strain tolerance, modulus and thermal conductivity. In this regard, the inner layer should have a thickness up to about 5 mils (127 microns). Typically, the thickness of the inner layer is in the range of from about 0.5 to about 2 mils (from about 13 to about 51 microns), more typically from about 1 to about 2 mils (from about 25 to about 51 microns).

The inner layer of TBCs may comprise a zirconia-containing ceramic composition that is stabilized in a certain region of the tetragonal phase so as to increase fracture toughness and thus impart improved impact resistance properties for the TBC. The fracture toughness and impact resistance properties of these inner layers can be predicted on the basis of the effect of the zirconia lattice stability equivalent of the respective zirconia-containing ceramic compositions. Fracture toughness and impact resistance performance have been found to be related to the zirconia lattice stability equivalent.

The lattice stability of these zirconia-containing ceramic compositions in the tetragonal phase can be calculated, including the effect of incremental additions of the stabilizing metal oxide, such as yttria. As the level of yttria decreases in the zirconia-containing ceramic composition, the c/a ratio conversely increases. It has been further found that, as the c/a ratio increases, fracture toughness increases and impact resistance improves, i.e., lowering the yttria level increases fracture toughness and improves the impact resistance performance of the high fracture toughness inner layer comprising the zirconia-containing ceramic composition.

To provide high fracture toughness inner layers having suitable impact resistance performance, the zirconia-containing-ceramic composition should have a c/a ratio that is typically in the range of from about 1.011 to about 1.016, more typically in the range of from about 1.013 to about 1.015. Suitable zirconia-containing compositions for use in high fracture toughness inner layer that have these c/a ratios can comprise at least about 90% zirconia. Typically, these zirconia-containing compositions comprise from about 93 to about 96% zirconia, more typically from about 93.5 to about 95.5% zirconia. Suitable zirconia-containing compositions for use in high fracture toughness inner layer 26 that have these c/a ratios further comprise a stabilizing amount of a stabilizing metal oxide. Typically, the stabilizing metal oxide is included in an amount of from about 4 to about 7% of the composition. Suitable stabilizing metal oxides can be selected from the group consisting of yttria, calcia, ceria, scandia, magnesia, india, lanthana, gadolinia, neodymia, samaria, dysprosia, erbia, ytterbia, europia, praseodymia, and mixtures thereof. The zirconia-containing ceramic compositions useful in high fracture toughness inner layers typically comprise yttria as the stabilizing metal oxide in an amount from about 4.5 to about 6.5% of the composition.

While the c/a ratio of the zirconia-containing composition has an especially strong effect on fracture toughness and impact resistance performance, it has been further found that the porosity level of the resultant protective inner layer of the TBC has an effect as well. Accordingly, additional fracture toughness and impact resistance benefits can be obtained by optionally making the inner layer denser, i.e., by reducing its porosity. This is typically achieved by forming the inner layer so as to have a fraction of porosity of about 0.20 or less, more typically about 0.15 or less. Typically, the inner layer has a fraction of porosity of from about 0.10 to about 0.20, more typically from about 0.10 to about 0.15.

Further fracture toughness and impact resistance benefits can be obtained by optionally having present in the inner layer up to about 10% hafnia. Typically, hafnia is present in the inner layer in an amount of from about 2 to about 7%, more typically from about 4 to about 6%. Other metal oxides, such as lanthana, neodymia, gadolinia and mixtures thereof can also be optionally present in the inner layer in amounts up to about 1%, more typically in the range of from about 0.3 about 0.5%. As a few examples only, suitable zirconia-containing ceramic compositions that comprise hafnia and/or these other metal oxides include those shown in the following Table 1:

TABLE 1

| Metal Oxide (Wt. %) | Composition 1 | Composition 2 | Composition 3 |
| --- | --- | --- | --- |
| Zirconia | 91.6 | 95.5 | 95.6 |
| Yttria | 4.0 | 4.0 | 4.0 |
| Hafnia | 4.4 | | |
| Lanthana | | 0.5 | |
| Neodymia | | | 0.4 |

Figure 4:
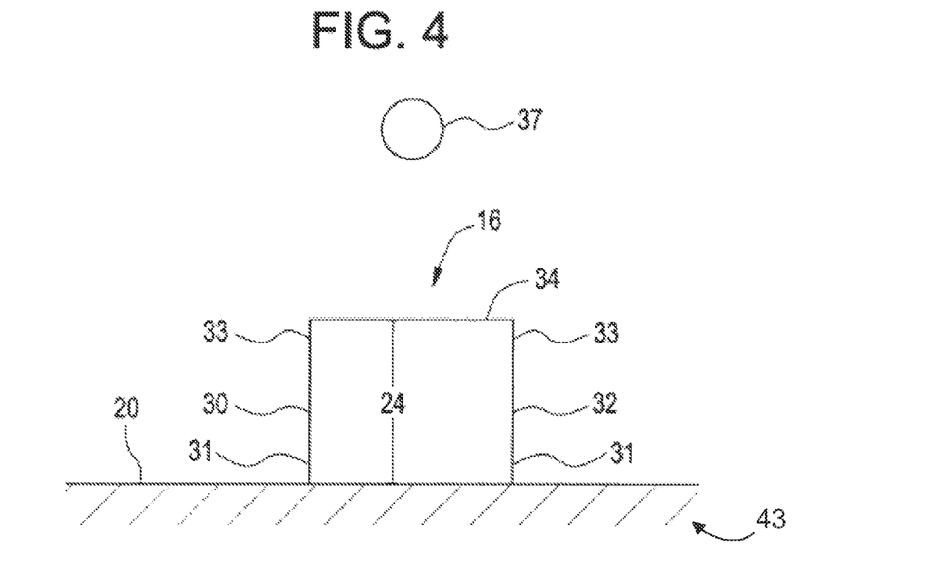
FIG. 4 is a cross section view of a ridge defining an exemplary embodiment of a pattern.

FIG. 4 shows an alternative exemplary embodiment in which the first and second sidewalls 30 and 32 are disposed as described above except that first and second sidewall are substantially perpendicular to the base surface 20. The top portion 34 connects second ends 33 of each of first and second sidewalls 30 and 32. The shape of the top portion 34 is flat and the top portion 34 is substantially parallel to the base surface 20. In an alternative exemplary embodiment, where the base surface 20 is the metallic or the ceramic interior surface of the shroud, the base surface 20 and the ridge 16 are unitary. The plurality of ridges 16 in this exemplary embodiment is machined into the interior surface of the turbine shroud 43. In other words, the interior surface of the shroud 43 and the plurality of ridges are unitary. Although the plurality of ridges 16 is machined in an exemplary embodiment, it is understood that any method of forming ridges in the metallic or the ceramic interior surface of the shroud is contemplated.

Figure 5:
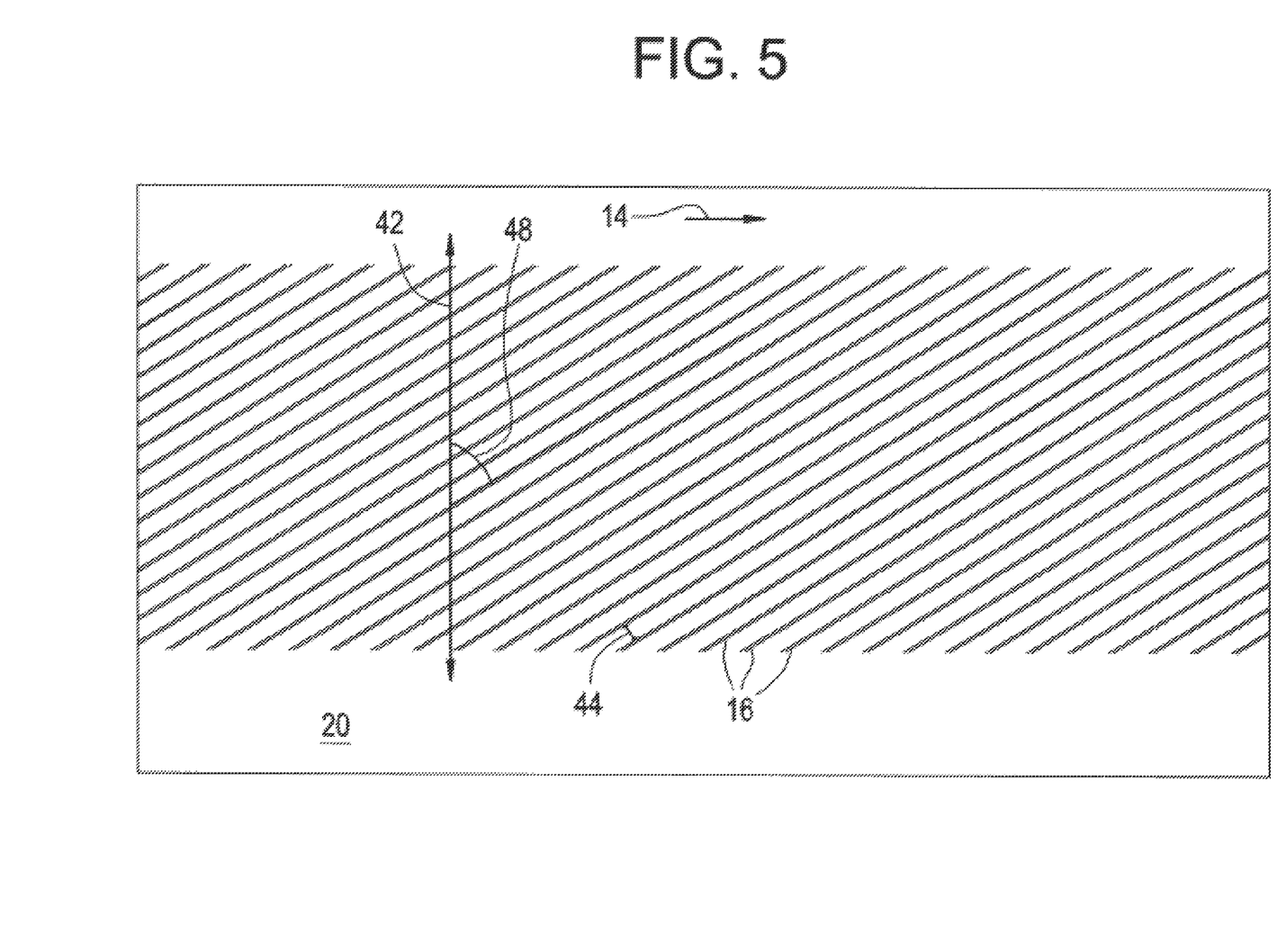
FIG. 5 is a plan view of a base surface having the abradable pattern in which the pattern is a plurality of parallel ridges in accordance with an exemplary embodiment.

FIG. 5 shows an exemplary embodiment of an abradable pattern in which the first plurality of ridges 16 is disposed in a pattern of parallel lines similar to those of FIG. 2. Arrow 14 indicates a direction of translation of the turbine bucket tip 10 (FIG. 2) with respect to the first plurality of ridges 16. A reference line 42 on the interior surface of the turbine shroud 43 representative of an axis of rotation of the turbine bucket (not shown) as is shown by a double-arrow. The turbine bucket rotates around a rotatable shaft indicated generally at 37 in FIG. 4. In an exemplary embodiment, the base surface 20 may be the interior surface of the turbine shroud 43. Although the turbine shroud is substantially cylindrical in shape, it is displayed herein as a flat surface for the sake of clarity. The first plurality of ridges 16 is disposed such that each ridge 16 is substantially parallel to each other ridge 16 of the first plurality of ridges 16. Each ridge 16 is also disposed such that there is an equal distance between each other ridge 16. A distance 44 between each ridge 16 ranges between about 1 mm to about 14 mm. A preferable distance 44 between each ridge 16 ranges between about 2 mm to about 7 mm. Each ridge 16 is further disposed such that a first angle 48 is formed with respect to the reference line 42. First angle 48 ranges from about 20 degrees to about 70 degrees.

Figure 6:
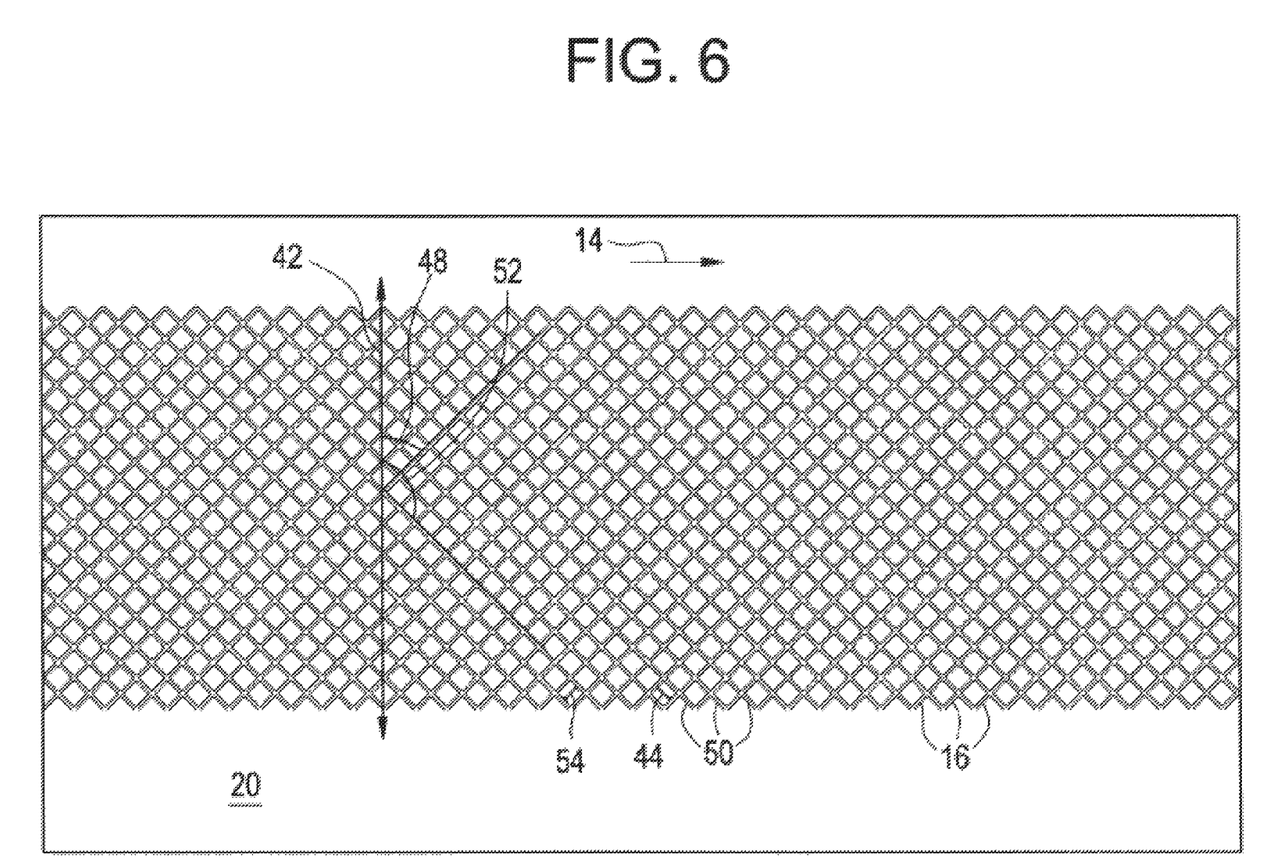
FIG. 6 is a plan view of the base surface having an abradable pattern in which the pattern is a first plurality of parallel ridges intersecting a second plurality of parallel ridges to form a diamond shape.

FIG. 6 shows an alternative exemplary embodiment in which the first plurality of ridges 16 disposed at the first angle 48 with respect to the reference line 42, intersect a second plurality of ridges 50 disposed at a second angle 52 with respect to the reference line 42. The pattern formed by the intersection of first and second plurality of ridges 16 and 50 is a diamond pattern. In this embodiment, arrow 14 shows a direction of translation of the turbine bucket tip 10 with respect to the first and second plurality of ridges 16 and 50. The first plurality of ridges 16 is disposed such that each ridge 16 of the first plurality of ridges 16 is substantially parallel to each other ridge 16 of the first plurality of ridges 16 as in FIGS. 2 and 5. Each ridge 16 of the first plurality of ridges 16 is also disposed such that there is an equal distance between each ridge 16. Distance 44 between contiguous ridges 16 ranges between about 1 mm to about 14 mm. A preferable distance 44 between contiguous ridges 16 ranges between about 2 mm to about 7 mm. Each ridge 50 is substantially parallel to each other ridge 50. Each ridge 50 is also disposed such that there is an equal distance between contiguous ridges 50. A distance 54 between each ridge 50 ranges between about 1 mm to about 14 mm, with a preferred distance 54 between each ridge 50 ranging between about 2 mm to about 7 mm. It will be recognized that distances 44 and 54 between each ridge 16 and each ridge 50 are substantially equal to each other in the diamond pattern of FIG. 6. The second plurality of ridges 50 is disposed such that each ridge forms the second angle 52 with respect to the reference line 42. Second angle 52 is different than first angle 48. In an exemplary embodiment, second angle 52 is complementary to first angle 48.

Figure 7:
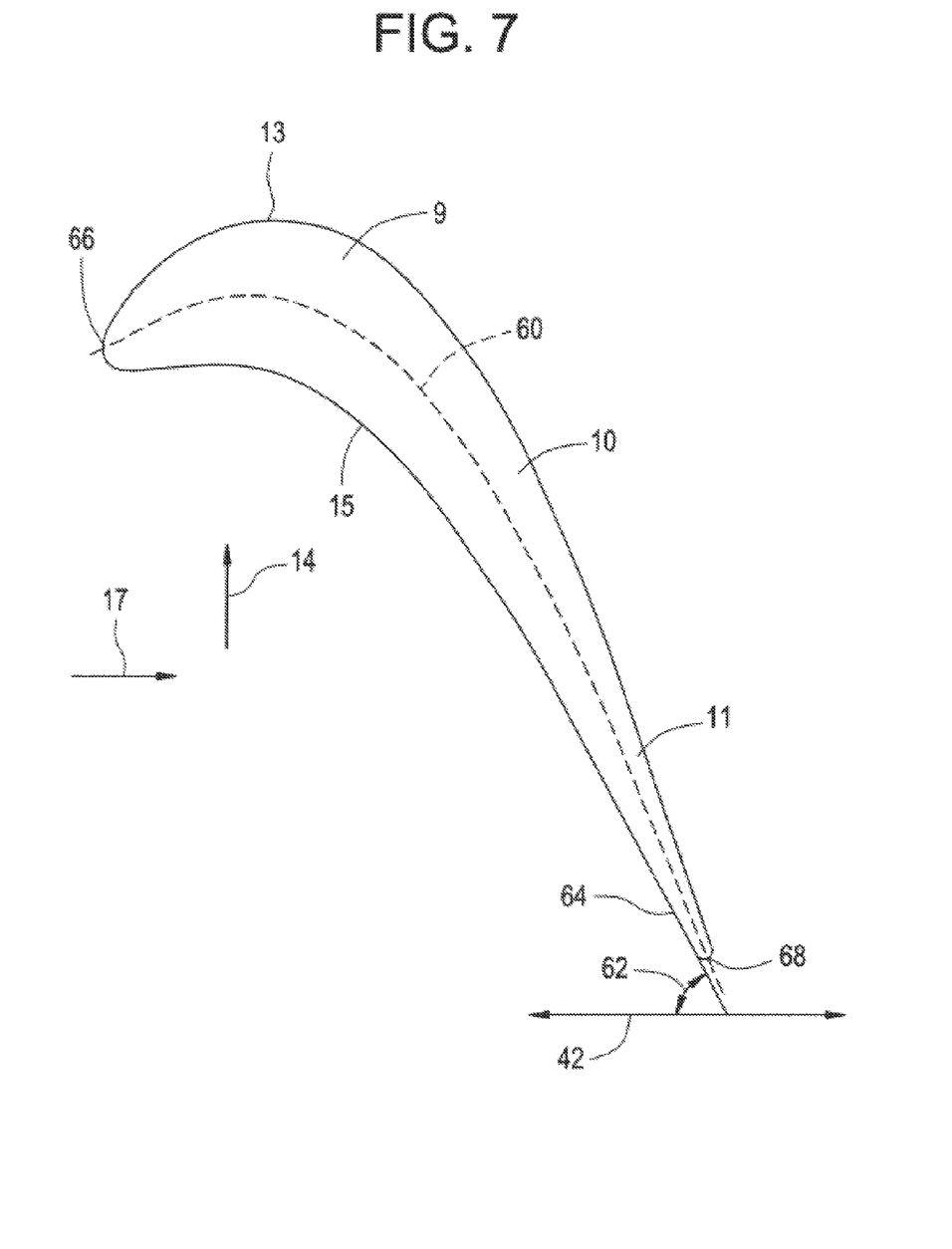
FIG. 7 shows a mean camber line through a cross section of a turbine bucket.

FIG. 7 shows a mean camber line 60 through a cross section of the turbine bucket corresponding to a turbine bucket tip 10. The mean camber line is an imaginary line that lies halfway between the leading surface 13 and the trailing surface 15 of the turbine bucket tip 10. The mean camber line 60 has a first end 66 and a second end 68. Arrow 14 shows a direction of translation of the turbine bucket tip 10 with respect to the first plurality of ridges 16. Arrow 17 indicates the direction of the fluid flow with respect to the bucket tip 10. The mean camber line 60 is a substantially curved shape near the front portion 9 of the turbine bucket tip 10, and the mean camber line 60 is substantially straight near the back portion 11 of the turbine bucket tip 10. The substantially curved shape of the mean camber line 60 includes a bend in a direction opposite the direction of translation 14. The bend increases in turning radius as the first end 66 is approached from the second end 68. The mean camber line 60 extends through the turbine bucket tip 10 from first end 66 to second end 68. An exit angle 62 is formed between the reference line 42 and a trailing edge 64 portion of the trailing surface 15 of the turbine bucket tip 10. The trailing edge 64 corresponds to the back portion 11 near the second end 68. In an exemplary embodiment, the first angle 48 (see FIGS. 5 and 6) of each ridge 16 is selected to match the exit angle 62.

Figure 8:
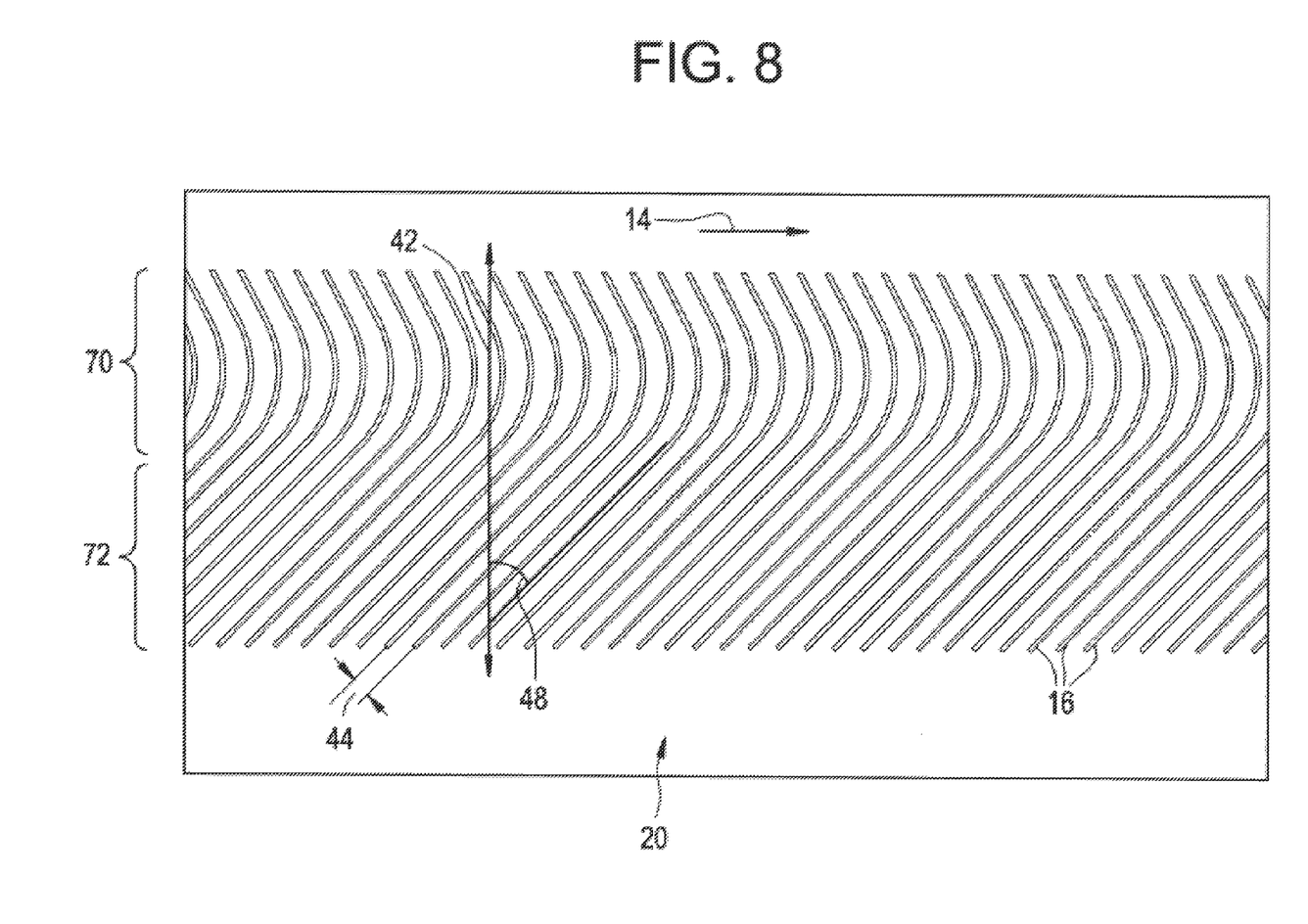
FIG. 8 is a plan view of the base surface having an abradable pattern in which the pattern is parallel lines, which are bent to a mean camber line at a portion of the pattern corresponding to a front portion of a turbine bucket.

FIG. 8 shows a view of an alternative exemplary embodiment of a pattern for an abradable coating defining a first plurality of ridges 116. The pattern includes a curved section 70 and a straight section 72. The curved section 70 is disposed at a portion of the pattern corresponding to the front portion 9 of the turbine bucket tip 10 when the turbine bucket tip 10 is in abradable communication with the pattern. The straight section 72 is disposed at a portion of the ridges 116 corresponding to the back portion 11 of the turbine bucket tip 10 when the turbine bucket tip 10 is in abradable communication with the pattern. The straight section 72 is at a first end of the ridges 116. The first plurality of ridges 116 are disposed on the base surface 20 such that each ridge 16 of the first plurality of ridges 116 is substantially parallel to each other ridge 116 in the straight section 72. Each ridge 116 is also disposed such that there is an equal distance between contiguous ridges 116 in both the curved and the straight sections 70 and 72. A distance 44 between each ridge 116 ranges between about 1 mm to about 14 mm, with a preferred distance 44 between each ridge 116 ranging between about 2 mm to about 7 mm The first plurality of ridges 116 is disposed in the straight section 72 such that first angle 48 is formed with respect to the reference line 42. First angle 48 ranges from about 20 degrees to about 70 degrees. In an exemplary embodiment, first angle 48 is selected to match the exit angle 62 (see FIG. 7). The curved section 70 includes a radius configured to substantially match a mean camber line 60 shape through the curved section 70.

Figure 9:
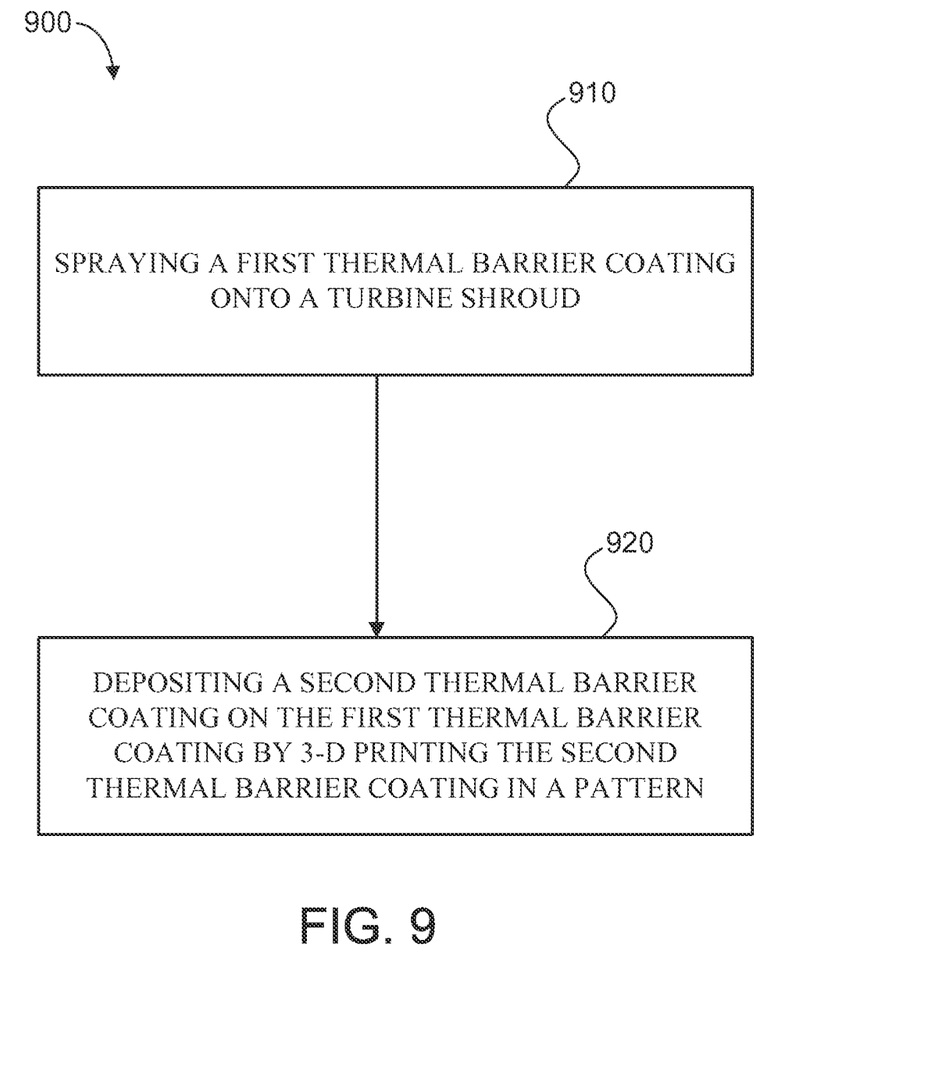
FIG. 9 is a flowchart of a 3-D printing method, according to an aspect of the present invention.

FIG. 9 is a flowchart of a method for 3-D printing a pattern onto a substrate, according to an aspect of the present invention. The method 900 for making an article of manufacture includes the step 910 of spraying a first thermal barrier coating onto a turbine shroud, the first thermal barrier coating formed of a dense vertically cracked coating comprising at least one of barium strontium aluminosilicate, yttria stabilized zirconia, ytterbia stabilized zirconia, magnesia stabilized zirconia, and calcia stabilized zirconia. A second step 920 deposits a second thermal barrier coating on the first thermal barrier coating by 3-D printing the second thermal barrier coating in a pattern, the second thermal barrier coating comprising at least one of barium strontium aluminosilicate, yttria stabilized zirconia, magnesia stabilized zirconia, and calcia stabilized zirconia. The pattern includes a first plurality of ridges disposed at a base surface of a turbine part. Each ridge of the first plurality of ridges defined by a first sidewall and a second sidewall. The first and second sidewalls each have a first end and an opposite second end. The first end of the first and second sidewalls extending from the base surface. The first and second sidewalls sloping toward each other until meeting at the second ends of respective first and second sidewalls defining a centerline and a top portion of the ridge. The first and second sidewalls are inclined with substantially equal but opposite slopes with respect to the base surface. At least a first portion of the first plurality of ridges corresponds to at least a back portion of a turbine bucket, and is oriented at a first angle with respect to an axis of rotation of the turbine bucket. The first angle ranges from about 20 degrees to about 70 degrees. The pattern includes the first plurality of ridges disposed at the base surface such that the each ridge of the first plurality of ridges is substantially parallel to each other. The first angle is equal to an exit angle of a trailing edge of the turbine bucket.

Porosity of the outer layer ridges is very important, as solid or dense ridges (low porosity) are too abrading on the bucket tip. A porosity range for the outer layer ridges is desirably in the range of about 10% to about 30%. Ranges above and below this may also be used depending on the specific material of the bucket tips. An advantage of the present invention is that the porosity of the ridges may be controlled, and even the various layers of each ridge may have a different porosity value.

Three dimensional printing uses a ceramic powder and a liquid binder. The ceramic powder may be barium strontium aluminosilicate, zirconia, yttria stabilized zirconia, magnesia stabilized zirconia, calcia stabilized zirconia or any other suitable ceramic material or mixture. This ceramic powder can be supplied with a particle size distribution from about 50 microns to about 200 microns. The binder material is typically mixtures of distilled water and isopropyl alcohol or denatured ethanol. Other binder materials and mixtures may also be used as desired with the specific ceramics.

Ridge porosity can be controlled by controlling the powder particle size distribution of the ceramic powder, saturation level (binder/volume ratio) and/or layer thickness. For example, porosity can be decreased by using a finer particle size (e.g., 50 microns), and porosity may be increased by using a larger particle size (e.g., 200 microns). Mixtures of particle sizes (i.e., particle size distribution) can be used to obtain fine control of the desired ridge or layer porosity. Saturation levels or the ratio between the powder and binder may also be adjusted to control porosity. As the saturation level (powder/binder ratio) increases less binder is available for powder binding/consolidation so the porosity increases. Conversely, as the saturation level decreases more binder is present for powder binding/consolidation so the porosity decreases. Layer thickness may also be used to control porosity. A thicker layer for each 3-D printing pass makes it more difficult for the binder to reach all of the powder, and a thinner printing pass makes it easier for the binder to reach the powder. Thinner layers result in denser/lower porosities and thicker layers can result in less dense or higher porosities.

As one example only, a 10%-30% porosity level can be achieved by a particle size distribution (or powder grain size) of about 100 microns, and/or about a 75% saturation ratio. This method can be applied to multiple layers in the ridges so that the lower layers have a lower porosity (e.g., about 10%) and the upper or top portions of the ridges may be printed to have a higher porosity (e.g., about 30%). This can be accomplished by actively modifying the grain size (particle size distribution), saturation ratio or layer thickness during the 3-D printing process. A big advantage here is that porous ceramic layers can be formed with specific porosities, which translates into desired abradable qualities for the ridges.

Each ridge of the first plurality of ridges may be equally spaced apart from each other by about 1 mm to about 14 mm or by about 2 mm to about 7 mm. A height of each ridge may range from about 0.1 mm to about 4 mm as measured vertically from the base surface to the top portion, or from about 0.25 mm to about 2 mm as measured vertically from the base surface to the top portion. A second plurality of ridges may be disposed at the base surface at a second angle with respect to the axis of rotation of the turbine bucket such that first and second plurality of ridges intersect, and the second angle is different than the first angle. The first plurality of ridges extend to a second portion of the first plurality of ridges corresponding to a front portion of the turbine bucket, and the second portion defining a curved section of the first plurality of ridges. The curved section may comprise the first plurality of ridges disposed such that the ridges bend substantially corresponding to a mean camber line shape of the turbine bucket.

The method 900 herein described has demonstrated substantially improved results that were unexpected. The results were unexpected because the method 900 of 3-D printing ridges in abradable coatings has resulted in fewer process steps and improved tolerances.

In addition, while the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. Moreover, the use of the terms first, second, etc. do not denote any order or importance, but rather the terms first, second, etc. are used to distinguish one element from another. Furthermore, the use of the terms a, an, etc. do not denote a limitation of quantity, but rather denote the presence of at least one of the referenced item.

The invention claimed is:

1. A method of making a turbine part, the method comprising:
    spraying a first coating onto the turbine part;
    3-D printing a second coating material disposed in a pattern onto the first coating, wherein the pattern comprises:
        a first plurality of ridges disposed at a base surface of the turbine part,
        each ridge of the first plurality of ridges defined by a first sidewall and a second sidewall, the first and second sidewalls each having a first end and an opposite second end, the first end of the first and second sidewalls extending from the base surface of the turbine part, the first and second sidewalls sloping toward each other until meeting at the second ends of respective first and second sidewalls defining a centerline and a top portion of the ridge, the first and second sidewalls inclining with substantially equal but opposite slopes with respect to the base surface of the turbine part;
    wherein at least a first portion of the first plurality of ridges corresponding to at least a back portion of a turbine bucket is oriented at a first angle with respect to an axis of rotation of the turbine bucket;
    wherein the first angle ranges from about 20 degrees to about 70 degrees;
    wherein the pattern includes the first plurality of ridges disposed at the base surface of the turbine part such that each ridge of the first plurality of ridges are substantially parallel to each other; and
    wherein the first angle is equal to an exit angle of a trailing edge of the turbine bucket.

2. The method of claim 1, wherein a porosity of the second coating is controlled by adjusting 3-D printing attributes selected from the group consisting of: a particle size distribution, a saturation level, a binder/volume ratio, a layer thickness, and combinations thereof.

3. The method of claim 2, wherein the particle size distribution is between about 50 microns and about 200 microns.

4. The method of claim 2 wherein the porosity of the second coating is between about 5% and about 50%.

5. The method of claim 2 wherein the porosity of the second coating is between about 10% and about 30%.

6. The method of claim 1, wherein the first coating is a dense vertically cracked thermal barrier coating.

7. The method of claim 1, wherein each ridge of the first plurality of ridges is equally spaced apart from each other by about 1 mm to about 14 mm.

8. The method of claim 1, wherein a height of each ridge ranges from about 0.25 mm to about 4 mm as measured vertically from the base surface to the top portion.

9. The method of claim 1, wherein a second plurality of ridges is disposed at the base surface at a second angle with respect to the axis of rotation of the turbine bucket such that first and second plurality of ridges intersect, and the second angle is different than the first angle.

10. The method of claim 1 wherein the first plurality of ridges extends to a second portion of the first plurality of ridges corresponding to a front portion of the turbine bucket, the second portion defining a curved section of the first plurality of ridges; and
    wherein, the curved section comprises the first plurality of ridges disposed such that the ridges bend substantially corresponding to a mean camber line shape of the turbine bucket.

11. The method of claim 1, wherein the base surface is selected from the group consisting of:
    a thermal barrier coating,
    a metallic bond coating, and
    a surface of the turbine shroud,
    the surface of the turbine shroud being at least one of metallic and ceramic.

12. The method of claim 11, wherein the thermal barrier coating is selected from the group consisting of:
    a barium strontium aluminosilicate,
    a pure zirconia,
    a yttria stabilized zirconia,
    a ytterbia stabilized zirconia,
    a magnesia stabilized zirconia, and
    a calcia stabilized zirconia,
    wherein the metallic bond coating is an inter-metallic of Beta-NiAl or a MCrAlX, wherein M is selected from the group consisting of nickel, cobalt, iron, and combinations thereof, and X is selected from the group consisting of yttria, zirconium, silicon, hafnium, and combinations thereof.

13. The method of claim 1, wherein the material is selected from the group consisting of:
    a ceramic coating,
    a ceramic surface of the turbine shroud,
    a metallic coating,
    a metallic surface of the turbine shroud, and
    combinations thereof.

14. A method of making an article of manufacture, the method comprising:
- spraying a first thermal barrier coating onto a part, the first thermal barrier coating formed of a dense vertically cracked coating; and
- depositing a second thermal barrier coating on the first thermal barrier coating by 3-D printing the second thermal barrier coating in a pattern,
- wherein the pattern comprises a plurality of ridges disposed at a base surface of the part, and
- wherein a porosity of the second thermal barrier coating is controlled by adjusting 3-D printing attributes selected from the group consisting of a particle size distribution, a saturation level, a binder/volume ratio, a layer thickness, and combinations thereof.

15. The method of claim 14, wherein the particle size distribution is between about 50 microns and about 200 microns.

16. The method of claim 14, wherein the porosity of the second thermal barrier coating is between about 5% and about 50%.

17. The method of claim 14, wherein the porosity of the second thermal barrier coating is between about 10% and about 30%.

18. The method of claim 14, wherein each ridge of the plurality of ridges is equally spaced apart from each other by about 1 mm to about 14 mm; and
- a height of each ridge of the plurality of ridges ranges from about 0.25 mm to about 4 mm as measured vertically from the base surface to a top portion.

19. The method of claim 14, wherein the first thermal barrier coating and the second thermal barrier coating comprise at least one of:
- a barium strontium aluminosilicate;
- a pure zirconia;
- a yttria stabilized zirconia;
- a ytterbia stabilized zirconia;
- a magnesia stabilized zirconia; and
- a calcia stabilized zirconia.

20. The method of claim 14, wherein the material comprises at least one of:
- a ceramic coating;
- a ceramic surface of the turbine shroud;
- a metallic coating; and
- a metallic surface of the turbine shroud.

* * * * *